United States Patent
Bauer et al.

(10) Patent No.: US 6,553,054 B1
(45) Date of Patent: Apr. 22, 2003

(54) LASER RESONATOR HAVING IMPROVED EFFICIENCY AND BEAM UNIFORMITY AND ASSOCIATED METHOD

(75) Inventors: Arthur H. Bauer, Newbury Park, CA (US); Drew A. Copeland, Westlake Village, CA (US); Alan Z. Ullman, Nothridge, CA (US)

(73) Assignee: The Boeing Company, Seattle, WA (US)

( * ) Notice: Subject to any disclaimer, the term of this patent is extended or adjusted under 35 U.S.C. 154(b) by 193 days.

(21) Appl. No.: 09/590,001

(22) Filed: Jun. 8, 2000

(51) Int. Cl.⁷ ............................................. H01S 3/091
(52) U.S. Cl. ........................................ 372/98; 372/72
(58) Field of Search ............................ 372/93, 95, 98, 372/99

(56) References Cited

U.S. PATENT DOCUMENTS

| | | | |
|---|---|---|---|
| 3,731,221 A | * 5/1973 | Spencer | 372/92 |
| 3,824,487 A | * 7/1974 | Buczek et al. | 372/95 |
| 4,267,524 A | * 5/1981 | Paxton | 372/95 |
| 4,516,244 A | 5/1985 | Holmes | |
| 4,520,486 A | 5/1985 | Lavarini | |
| 4,872,179 A | 10/1989 | Nitsche et al. | |
| 5,045,719 A | 9/1991 | Ayral et al. | |
| 5,157,684 A | * 10/1992 | Benda | 372/95 |
| 5,173,916 A | * 12/1992 | Benda | 372/92 |
| 5,202,898 A | 4/1993 | Sugawara et al. | |
| 5,327,449 A | 7/1994 | Du et al. | |
| 5,394,428 A | 2/1995 | McLellan | |
| RE35,215 E | 4/1996 | Waarts et al. | |
| 5,546,222 A | * 8/1996 | Plaessmann et al. | 359/346 |
| 5,559,823 A | 9/1996 | Valette | |
| 5,675,596 A | 10/1997 | Kong et al. | |
| 5,684,812 A | 11/1997 | Shih | |
| 5,764,680 A | 6/1998 | Watson | |
| 5,838,710 A | * 11/1998 | Larat et al. | 372/69 |

\* cited by examiner

Primary Examiner—Paul Ip
Assistant Examiner—Dung Nguyen
(74) Attorney, Agent, or Firm—Alston & Bird LLP (57) ABSTRACT

A laser resonator and an associated method are provided which produce a laser beam having a relatively uniform intensity profile following a single pass through a single laser cavity. The laser resonator includes a laser cavity through which a chemical medium flows from an upstream end to a downstream end. The laser resonator also includes a first optical element, typically termed a secondary mirror, for directing an expanding laser beam across the cavity. The laser resonator also includes a second optical element disposed opposite the first optical element relative to the laser cavity. Typically, the second optical element is a set of primary mirrors and, more particularly, a pair of primary mirrors for both collimating and spatially inverting the laser beam relative to the predetermined flow direction of the chemical medium through the laser cavity. Once the expanded laser beam has been collimated and spatially inverted, the laser beam is redirected across the laser cavity. The laser resonator can also include a third optical element, such as a scraper mirror, that receives the redirected laser beam following its propagation across the laser cavity and that forms an output laser beam following a single pass of the collimated laser beam across the laser cavity.

16 Claims, 5 Drawing Sheets

LASER RESONATOR HAVING IMPROVED EFFICIENCY AND BEAM UNIFORMITY AND ASSOCIATED METHOD

FIELD OF THE INVENTION

The present invention relates generally to laser resonators and associated methods and, more particularly, to chemical laser resonators and associated methods.

BACKGROUND OF THE INVENTION

Chemical lasers, such as chemical oxygen iodine laser (COIL) devices, generate output signals having relatively high intensity. As such, chemical lasers are used in a variety of applications including high energy laser (HEL) weapons and the like.

Figure 1:
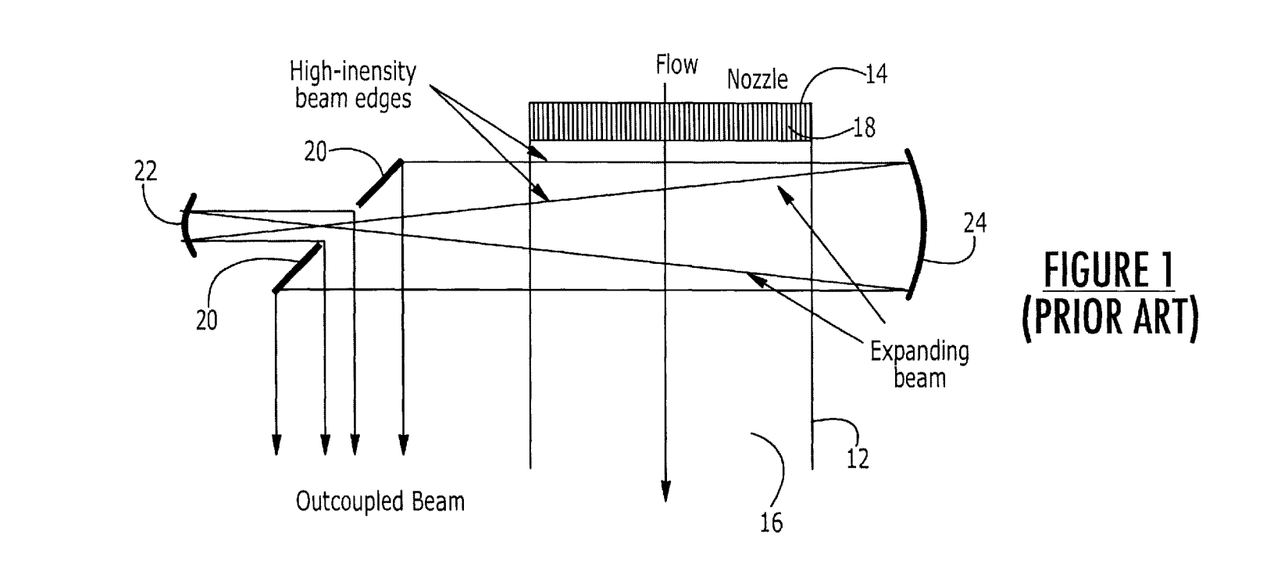
FIG. 1 is a schematic representation of one embodiment of a conventional chemical laser.

For purposes of explanation, a conventional chemical laser 10 is depicted in FIG. 1. A chemical laser includes a laser cavity 12 having opposed upstream and downstream ends 14, 16. A lasing medium flows through the laser cavity in a predetermined flow direction from the upstream end of the laser cavity to the downstream end of the laser cavity. While chemical lasers can include different lasing mediums, a COIL device generally includes a lasing medium containing the species $O_2(^1\Delta)$ (electronically-excited oxygen) and $I^*$ (electronically-excited iodine atoms). As shown in FIG. 1, the laser cavity typically includes an upstream end defined by a nozzle 18 through which the lasing medium enters the laser cavity and a downstream end through which the lasing medium exits the laser cavity after extraction of some of the medium energy in the form of a laser beam.

FIG. 1 also depicts the resonator structure that cooperates with the laser cavity 12 for producing the output signals having a relatively high intensity level. The resonator of FIG. 1 is a negative branch standing wave resonator in which the laser beam makes a single pass through a single laser cavity. In this regard, only the collimated passes of the laser beam through the laser cavity are counted with the laser beam also assumed to traverse the laser cavity as an expanding beam, as shown in FIG. 1. The laser resonator is comprised of several optical components, including a scraper 20 for outcoupling a substantial portion of the laser beam, thereby providing the output signals. The laser resonator also includes a secondary mirror 22 positioned rearwardly of the scraper relative to the laser cavity for reflecting a portion of the laser beam back through the laser cavity. As depicted in FIG. 1, the secondary mirror redirects a portion of the laser beam, typically a center portion of the laser beam, in such a manner that the laser beam again expands to its full size prior to being collimated. The laser resonator also includes a primary mirror 24 positioned opposite the scraper and the secondary mirror relative to the laser cavity for collimating the expanding laser beam and for redirecting the collimated laser beam back through the laser cavity.

Since the secondary mirror 22 is a concave mirror positioned rearward of the scraper 20 relative to the laser cavity 12, the portion of the laser beam redirected by the secondary mirror must pass through focus prior to expanding and being collimated by the primary mirror 24. As such, the laser resonator of FIG. 1 is referred to as a negative branch standing wave resonator. Alternatively, the secondary mirror could be a convex mirror positioned proximate to the scraper or rearwardly of the scraper relative to the laser cavity for redirecting a portion of the laser beam back through the laser cavity in such a manner that the redirected portion of the laser beam expands while passing through the laser cavity without passing through focus. As known to those skilled in the art, this alternative type of resonator structure is a positive branch standing wave resonator.

Figure 2A:
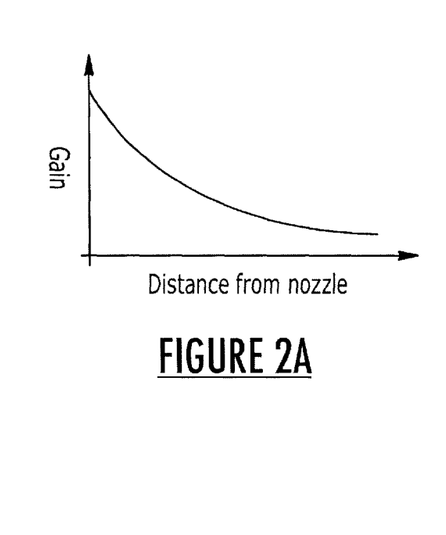
FIG. 2a is a graph representing the gain provided by the lasing medium within the laser cavity as a function of the distance from the nozzle.
Figure 2B:
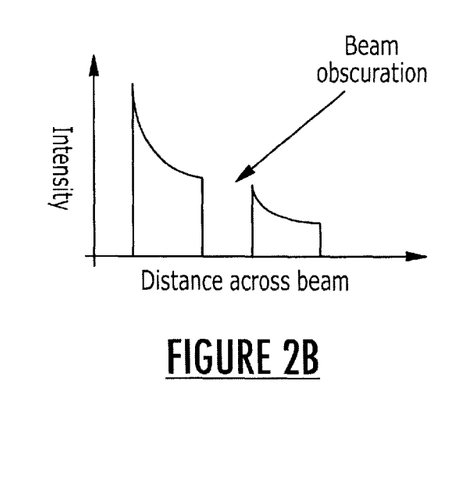
FIG. 2b is a graph depicting the intensity of the laser beam output by the chemical laser of FIG. 1 as a function of the distance across the laser beam.

Since the chemicals that produce the gain and/or power are progressively consumed as the laser beam is generated, the gain or amplification provided by the chemical laser progressively drops as the distance of the laser beam from the nozzle 18 increases. By way of illustration, FIG. 2a depicts the gain provided by the laser cavity 12 as a function of the distance from the nozzle with signals that traverse the laser cavity at distances further from the nozzle having lower gain. As such, the resulting outcoupled beam has a strongly peaked ("sugar scooped") intensity profile as depicted in FIG. 2b. As will be noted, the intensity profile has a gap in the center portion thereof due to beam obscuration caused by the redirection of a portion of the laser beam back through the laser cavity by the secondary mirror 22. As a result of the peaked intensity profile, the chemical laser 10 of FIG. 1 does not generate the laser beam as efficiently as desired. Additionally, since the intensity of the laser beam varies across the width of the laser beam, the propagation of the outcoupled laser beam is degraded. In this regard, those portions of the laser beam having a greater intensity will heat the air or other atmosphere through which the laser beam is propagating to a greater degree than those portions of laser beam having a lower intensity. Thus, different portions of the laser beam will be diffracted in unequal amounts by the differently heated air. Moreover, in order to ensure that the average intensity of the laser beam is greater than a predetermined intensity level, that portion of the laser beam having the greatest intensity may have an excessively high intensity which may cause coating damage to the laser optics.

Figure 3:
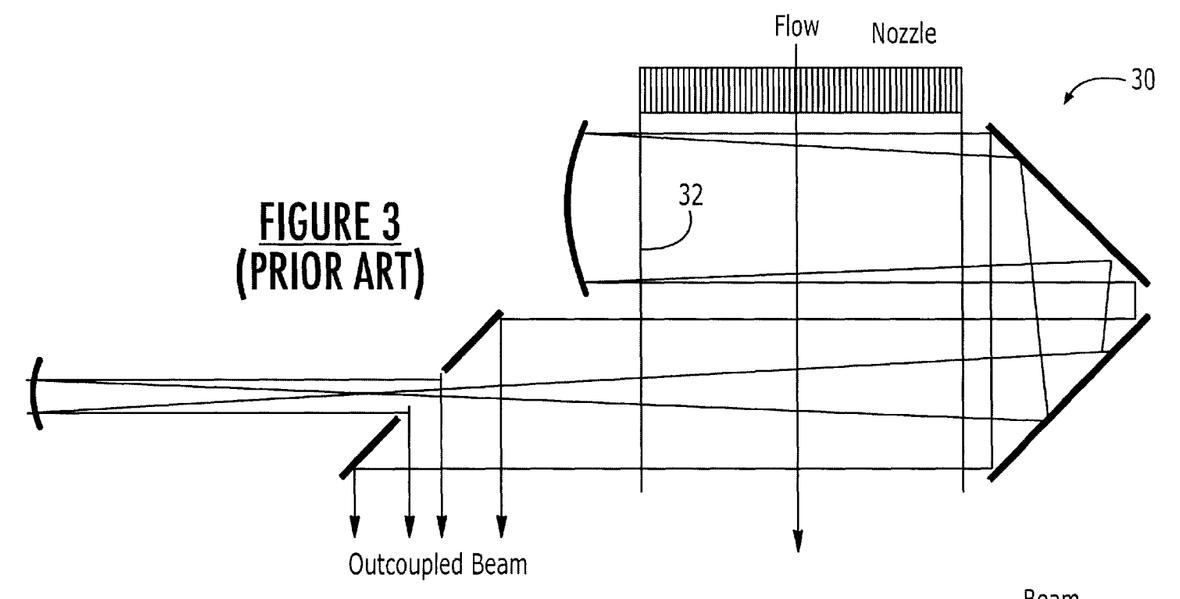
FIG. 3 is a schematic representation of another embodiment of a conventional chemical laser.
Figure 4:
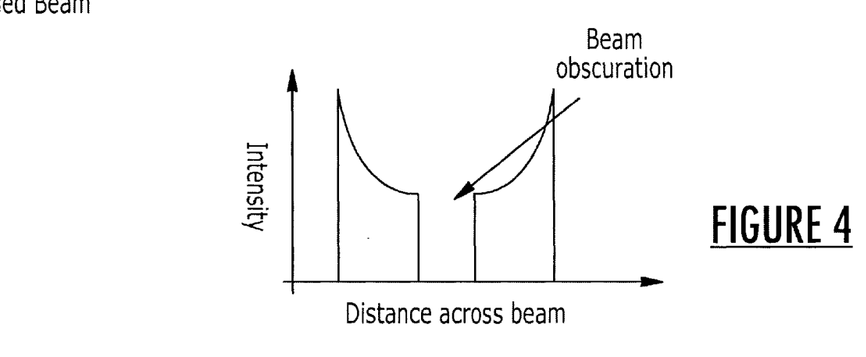
FIG. 4 is a graph representing the intensity of an output laser beam as a function of the distance across the laser beam.

In order to avoid at least some of the shortcomings of the chemical laser 10 depicted in FIG. 1, other types of chemical lasers have been designed. As depicted in FIG. 3, for example, another conventional chemical laser 30 is designed such that the laser beam passes through the laser cavity 32 twice as a collimated laser beam. In this regard, the laser resonator of the embodiment of FIG. 3 includes several additional mirrors to invert and translate the laser beam. As described above in conjunction with the embodiment of FIG. 1, the gain provided by the lasing medium diminishes in the downstream direction since the chemicals that produce the gain and/or power are progressively consumed as the laser beam is generated. By including mirrors to invert the laser beam following each pass through the laser cavity, one edge of the laser beam is not always nearest the upstream portion of the laser cavity and the other edge of the laser beam is not always nearest the downstream portion of the laser cavity. Instead, each edge of the laser beam is located nearest both the upstream and downstream portions of the laser cavity during different passes through the laser cavity. As such, the intensity profile is no longer "sugar scooped". In this regard, FIG. 4 provides a graph depicting the intensity of the outcoupled beam as a function of the distance across the beam which illustrates that the opposed edges of the laser beam have the greatest intensity and the center portion of the laser beam has the lowest intensity. While the intensity profile is more uniform and the chemical laser of FIG. 3 generally has improved extraction efficiency relative to the chemical laser of FIG. 1, the chemical laser of FIG. 3 disadvantageously requires additional powered optics, i.e., those optical elements, such as mirrors, that reflect or otherwise redirect a collimated laser beam. In addition, the length of the laser resonator can become relatively long since considerable spacing is typically required between the laser cavity and the optical elements.

Figure 5:
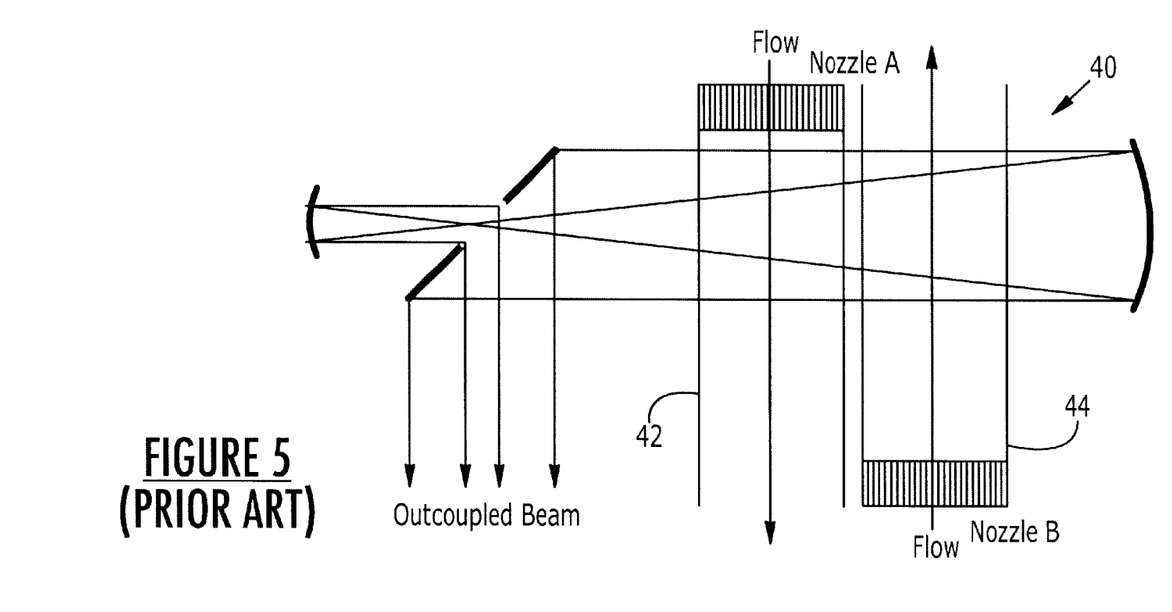
FIG. 5 is a schematic representation of yet another embodiment of a conventional chemical laser.
Figure 6:
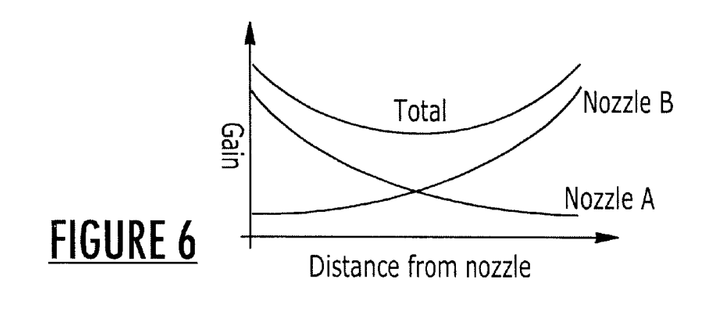
FIG. 6 is a graph illustrating the gain provided individually by each laser cavity as well as the collective gain provided by the chemical laser of FIG. 5.

Another conventional chemical laser 40 that is designed to create a more uniform laser beam intensity profile is depicted in FIG. 5. In this embodiment, the chemical laser includes first and second laser cavities 42, 44 to provide smoothing of the beam profile. As shown, the chemical laser of this embodiment is similar to the embodiment depicted in FIG. 1 with the exception that the laser beam passes through not one, but two laser cavities that are positioned side-by-side. By positioning the laser cavities such that the direction of flow of the lasing medium through one laser cavity 18 is opposite the direction of flow of the lasing medium through the other laser cavity, a gain profile is produced that is slightly U-shaped, but that does not drop off sharply from either edge of the laser beam. In this regard, FIG. 6 depicts the gain associated with each laser cavity (designated Nozzle A and Nozzle B) as well as the total gain of the chemical laser as a function of the distance from Nozzle A. As such, the intensity profile for a laser beam having passed through the chemical laser of FIG. 5 as a function of the distance across the beam is the same as the intensity profile depicted in FIG. 4 in conjunction with the embodiment of the chemical laser of FIG. 3. In this regard, the edges of the outcoupled laser beam each have a greater intensity than a center portion of the laser beam. While the chemical laser of FIG. 5 has a more uniform laser beam intensity profile than that provided by the chemical laser of FIG. 1, the chemical laser of FIG. 5 is substantially more complex and expensive since an entirely separate second laser cavity has been added.

While a variety of chemical lasers have therefore been developed, conventional chemical lasers still suffer from shortcomings. In this regard, the chemical lasers that have the least complex design generally produce laser beams having a strongly peaked ("sugar scooped") intensity profile. Not only is the generation of such strongly peaked intensity profiles relatively inefficient, but the propagation of the laser beam may be degraded due to differential heating of the air or other atmosphere through which the laser beam propagates. In addition, in embodiments in which a relatively high average intensity is desired, the portion of the laser beam having the highest intensity may be of a sufficiently high intensity to cause coating damage to the laser optics. While other chemical lasers have been designed that generate a more uniform intensity profile, these other chemical lasers generally have a substantially more complex design by requiring either multiple passes through a single laser cavity or a single pass through multiple laser cavities. As such, it would be desirable to develop a chemical laser having a relatively simple design that produces a laser beam having a relatively uniform intensity profile.

SUMMARY OF THE INVENTION

A laser resonator and an associated method are therefore provided according to the present invention which produce a laser beam having a relatively uniform intensity profile following a single pass through a single laser cavity. As a result, the laser resonator and associated method of the present invention are substantially less complex than at least some of the conventional chemical laser designs. By producing a laser output having a more uniform intensity profile, however, the laser resonator and associated method of the present invention can efficiently generate a laser beam in a manner that should not cause coating damage to the laser optics and should permit propagation of the laser beam in a relatively uniform manner.

The laser resonator includes a laser cavity having opposed upstream and downstream ends. As such, the laser cavity is adapted to support flow of a chemical medium in a predetermined flow direction from the upstream end of the laser cavity to the downstream end of the laser cavity. The laser resonator also includes a first optical element, typically termed a secondary mirror, for directing an expanding laser beam across the cavity. The expanding laser beam has opposed first and second opposed edges and the expanding laser beam is directed across the laser cavity in such a manner that the first edge of the expanding laser beam is nearer the upstream end of the laser cavity than the second edge of the expanding laser beam. The laser resonator also includes a second optical element disposed opposite the first optical element relative to the laser cavity. Typically, the second optical element is a set of primary mirrors and, more particularly, a pair of primary mirrors for both collimating and spatially inverting the laser beam relative to the predetermined flow direction of the chemical medium through the laser cavity. Once the expanded laser beam has been collimated and spatially inverted, the laser beam is redirected across the laser cavity. As such, the first edge of the redirected laser beam is now downstream of the second edge of the redirected laser beam.

The laser resonator can also include a third optical element that receives the redirected laser beam following its propagation across the laser cavity and that forms an output laser beam following a single pass of the collimated laser beam across the laser cavity. Typically, the third optical element is positioned proximate the first optic element and can be a scraper mirror.

According to the present invention, the portions of the expanding laser beam proximate the first edge are more greatly amplified than portions of expanding laser beam proximate the second edge while the expanding laser beam initially propagates across the laser cavity. By spatially inverting the laser beam, however, the portions of the redirected laser beam proximate the second edge are more greatly amplified than the portions of the redirected laser beam proximate the first edge while the redirected laser beam propagates across the laser cavity. As such, the intensity profile of the output laser beam is relatively uniform. In addition, the design of the laser resonator is much less complex than at least some conventional chemical lasers.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 7:
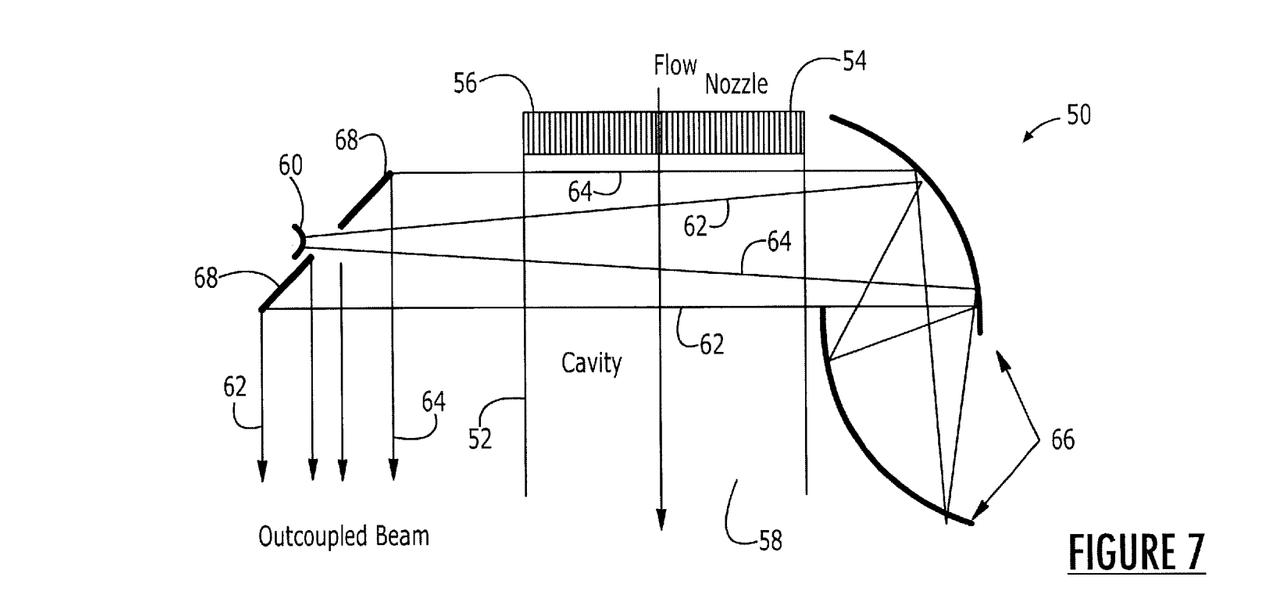
FIG. 7 is a schematic representation of a laser resonator according to one embodiment of the present invention.

A laser resonator 50 according to one advantageous embodiment of the present invention is depicted in FIG. 7. As shown, the laser resonator is a chemical laser, such as a chemical oxygen iodine laser (COIL) device. As such, the laser resonator includes a laser cavity 52 adapted to support flow of a chemical medium in a predetermined flow direction. In one advantageous embodiment, the chemical medium contains the species $O_2(^1\Delta)$ (electronically-excited oxygen) and $I^*$ (electronically-excited iodine atoms), although other chemical mediums can be utilized, if so desired. The laser cavity typically includes an upstream end 54 defined by a nozzle 56 through which the chemical medium enters the laser cavity and a downstream end 58 through which the chemical medium exits the laser cavity after extraction of some of the medium energy in the form of a laser beam. In this regard, spontaneous emissions by the chemical medium provide the origins of the laser beam that is repeatedly reflected through the laser cavity.

The laser resonator 50 also includes a number of optical elements positioned on opposite sides of the laser cavity 52 for directing a laser beam across the laser cavity. In this regard, the laser resonator includes a first optical element 60 for directing an expanding laser beam across the laser cavity, during which time the expanding laser beam is amplified. The expanding laser beam has first and second edges 62, 64, respectively, and the expanding laser beam is directed across the laser cavity in such a manner that the first edge of the expanding laser beam is nearer the upstream end 54 of the laser cavity than the second edge of the expanding laser beam. As shown in FIG. 7, the first optical element is typically a secondary mirror. As also shown in FIG. 7, the secondary mirror can be a convex mirror. However, the secondary mirror can also be a concave mirror, as depicted in the embodiments of conventional chemical lasers shown in FIGS. 1, 3 and 5.

The laser resonator 50 also includes a second optical element 66 disposed opposite the first optic element 60 relative to the laser cavity 52. As depicted in FIG. 7, the second optical element typically comprises a set of primary mirrors and, more particularly, a pair of primary mirrors. In the embodiment in which the set of primary mirrors includes first and second primary mirrors as shown in FIG. 7, the first primary mirror redirects the expanded laser beam to the second primary mirror which, in turn, redirects the laser beam to the first primary mirror for redirection across the laser cavity, during which time the redirected laser beam is amplified. In reflecting the laser beam between the first and second primary mirrors, however, the laser beam is both collimated and spatially inverted. More specifically, the laser beam is spatially inverted relative to the predetermined flow direction of the chemical medium through the laser cavity. As such, the collimated laser beam that is redirected by the primary mirrors across the laser cavity has been spatially inverted such that the first edge 62 of the redirected laser beam is now nearer the downstream end 58 of the laser cavity than the second edge 64 of the redirected laser beam.

The laser resonator 50 also includes a third optical element 68, typically positioned proximate the first optical element 60. The third optical element is designed to receive the redirected laser beam following its propagation across the laser cavity 52 and to form an output laser beam, i.e., an outcoupled beam, following a single pass of the collimated laser beam across the laser cavity. As such, the third optical element can be a scraper mirror. As shown in FIG. 7 and as known to those skilled in the art, a medial portion of the scraper mirror generally defines an opening in which the first optical element, i.e., the secondary mirror, is positioned. Thus, the first optical element also receives a portion of the collimated laser beam. In turn, the first optical element redirects the portion of the laser beam back across the laser cavity in an expanding manner in order to continue the lasing process.

Figure 8:
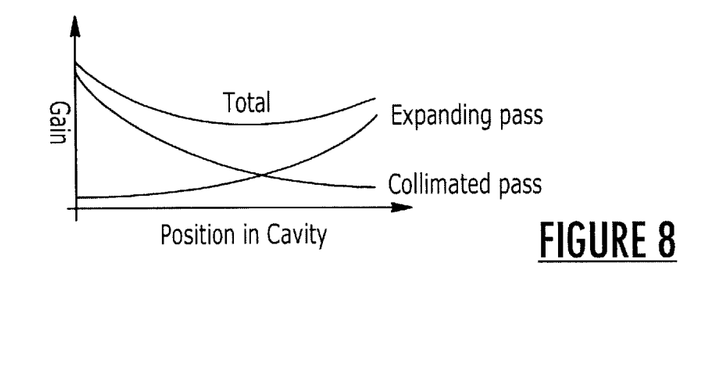
FIG. 8 is a graph depicting the gain provided by the lasing medium of the laser resonator of FIG. 7.

As discussed above, the gain provided by the laser cavity 52 diminishes in a downstream direction as the chemical medium is consumed. By spatially inverting the laser beam prior to redirecting the collimated laser beam across the laser cavity, the laser resonator 50 and associated method of the present invention produce an output laser beam having a relatively uniform gain profile across the width of the laser beam, as depicted in FIG. 8. With more specific reference to the graph in FIG. 8, the gain is depicted for the collimated laser beam received by the secondary mirror 60 and the scraper 68 as a function of the position of the laser beam within the laser cavity, i.e., as a function of the distance of the laser beam from the nozzle 56 at the first end 54 of the laser cavity. In other words, the gain provided to the first edge 62 of the laser beam is depicted on the right side of FIG. 8 since the first edge is furthest from the nozzle during the collimated pass through the laser cavity, while the gain provided to the second edge 64 of the laser beam is depicted on the left side of FIG. 8 since the second edge is nearest to the nozzle during the collimated pass through the laser cavity. As FIG. 8 indicates, the total gain of the laser beam is made up of two components, namely, the gain introduced while the expanding laser beam passes through the laser cavity and the gain introduced while the collimated laser beam returns through the laser cavity. By summing the gain provided to both the expanding and collimated laser beams, the total gain provided by the laser resonator of the present invention can be derived as depicted in FIG. 8.

Figure 9A:
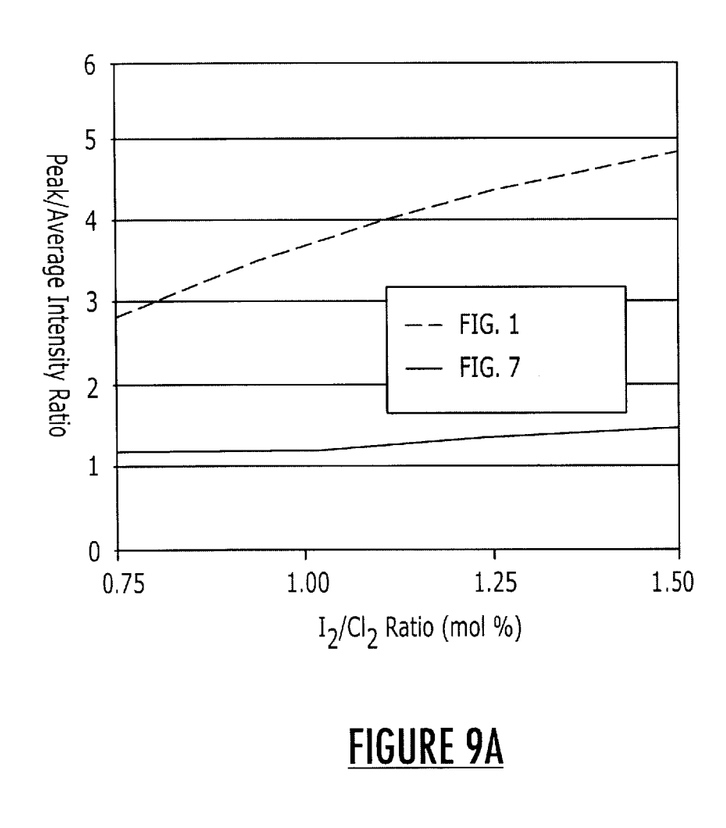
FIG. 9a is a graph of the peak/average intensity ratio of the laser resonator of FIG. 7 in comparison to a conventional chemical laser, such as depicted in FIG. 1.

As depicted in FIG. 8, the gain provided by the laser resonator 50 and associated method of the present invention is much smoother than the gain profiles provided by conventional chemical lasers, such as those depicted in FIGS. 2b and 4. As such, the resulting output laser beam has a more uniform intensity across the width of the laser beam. By having a more uniform intensity, the difference between the highest intensity portion of the laser beam and the lowest intensity portion of the laser beam is reduced. By way of illustration, FIG. 9a depicts the ratio of the peak intensity value to the average intensity value for an output laser beam produced by a laser resonator of the present invention as depicted in FIG. 7 and for an output laser beam produced by a conventional chemical laser as depicted in FIG. 1 for different $I_2/Cl_2$ ratios. This ratio characterizes the gain, i.e., amplification, of the lasing medium and is typically adjusted as known to those skilled in the art to optimize laser performance. As will be noted, the ratio of the peak intensity value to the average intensity value across the output laser beam produced by the laser resonator of the present invention is only slightly greater than one, thereby evidencing the relatively uniform gain across the width of the laser beam.

By having a relatively uniform gain across the width of the laser beam, the output beam will not generally differentially heat the air or other atmosphere through which the laser beam propagates in a manner which will cause unequal amounts of diffraction, thereby disadvantageously distorting or otherwise altering the laser beam as described above in conjunction with the laser output by conventional chemical lasers. In addition, by having a relatively uniform gain across the width of the laser beam, the laser resonator 50 of the present invention can produce an output beam having a relatively high average intensity without having the highest intensity portions of the laser beam being of such large intensity that the optical elements are damaged.

Figure 9B:
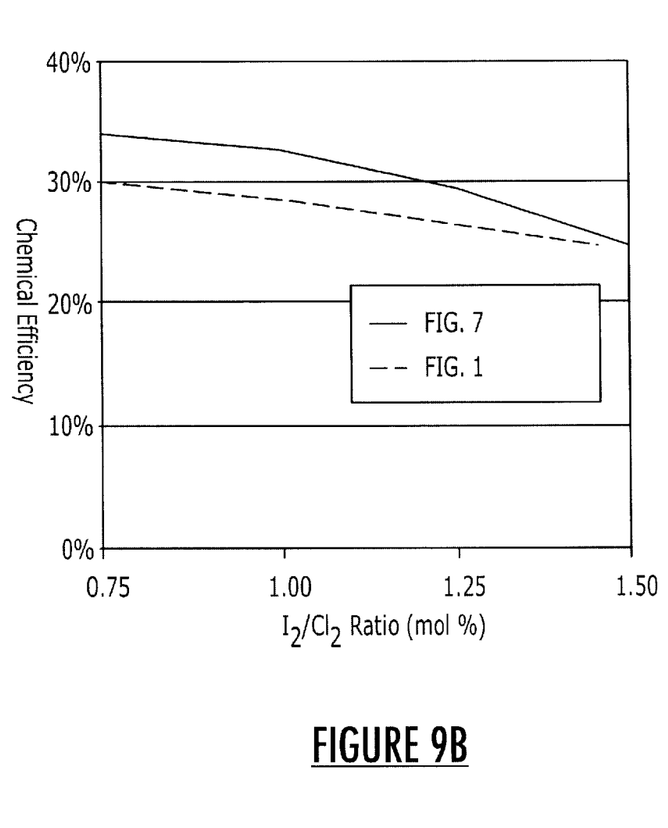
FIG. 9b is a graph depicting the chemical efficiency of the laser resonator of FIG. 7 relative to a conventional chemical laser, such as depicted in FIG. 1.

Additionally, the laser resonator 50 and associated method of the present invention may operate more efficiently than conventional chemical lasers, such as depicted in FIG. 1. In this regard, the chemical efficiencies of a laser resonator of the present invention as depicted in FIG. 7 and a conventional chemical laser as depicted in FIG. 1 are illustrated as a function of the $I_2/Cl_2$ ratio. As shown in FIG. 9b, the efficiency of the laser resonator and associated method of the present invention is about 10% greater than the efficiency of the conventional chemical laser depicted in FIG. 1.

Furthermore, the laser resonator 50 and associated method of the present invention is substantially less complex than conventional chemical lasers that utilize a multiple pass approach or that utilize multiple laser cavities. Thus, the laser resonator and associated method of the present invention provide an output laser beam having a much smoother and more uniform intensity profile without requiring a disadvantageously complex design. The laser resonator of the present invention can therefore be deployed in a variety of applications, including applications as a HEL weapon or the like.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A laser resonator comprising:
    a laser cavity having opposed upstream and downstream ends, said laser cavity to support flow of a chemical medium in a predetermined flow direction from the upstream end of said laser cavity to the downstream end of said laser cavity;
    a first optical element for directing an expanding laser beam having opposed first and second edges across said laser cavity such that the first edge of the expanding laser beam is nearer the upstream end of said laser cavity than the second edge of the expanding laser beam; and
    a second optical element, disposed opposite said first optical element relative to said laser cavity and responsive to the expanding laser beam following propagation across said laser cavity, for both collimating and spatially inverting the laser beam prior to redirecting the collimated and spatially inverted laser beam across said laser cavity such that the first edge of the redirected laser beam is nearer the downstream end of said laser cavity than the second edge of the redirected laser beam.

2. A laser resonator according to claim 1 further comprising a third optical element, responsive to the redirected laser beam following propagation across said laser cavity, for forming an output laser beam following a single pass of the collimated laser beam across said laser cavity.

3. A laser resonator according to claim 2 wherein said third optical element is positioned proximate said first optical element.

4. A laser resonator according to claim 2 wherein said third optical element is a scraper mirror.

5. A laser resonator according to claim 1 wherein said second optical element comprises at least two primary mirrors for collimating and spatially inverting the laser beam.

6. A laser resonator according to claim 1 wherein said first optical element is a convex mirror for directing the expanding laser beam across said laser cavity.

7. A laser resonator comprising:
    a laser cavity having opposed upstream and downstream ends, said laser cavity to support flow of a chemical medium in a predetermined flow direction from the upstream end of said laser cavity to the downstream end of said laser cavity;
    a secondary mirror for directing an expanding laser beam across said laser cavity; and
    a set of primary mirrors, positioned opposite said secondary mirror relative to said laser cavity, for collimating the expanded laser beam and for spatially inverting the expanded laser beam relative to the predetermined flow direction of the chemical medium through said laser cavity prior to redirecting the collimated and spatially inverted laser beam across said laser cavity.

8. A laser resonator according to claim 7 further comprising a scraper mirror, responsive to the redirected laser beam following propagation across said laser cavity, for forming an output laser beam following a single pass of the collimated laser beam across said laser cavity.

9. A laser resonator according to claim 8 wherein said scraper mirror is positioned proximate said secondary mirror and opposite said set of primary mirrors relative to said laser cavity.

10. A laser resonator according to claim 7 wherein said set of primary mirrors comprises a pair of concave primary mirrors.

11. A laser resonator according to claim 7 wherein said secondary mirror is a convex mirror for directing the expanding laser beam across said laser cavity.

12. A method for generating a laser beam comprising:
    establishing a flow of a chemical medium in a predetermined flow direction;
    directing an expanding laser beam having opposed first and second edges across the flow of the chemical medium such that the first edge of the expanding laser beam is upstream of the second edge of the expanding laser beam;
    both collimating and spatially inverting the expanded laser beam following propagation across the flow of the chemical medium and prior to again directing the laser beam across the flow of the chemical medium; and redirecting the collimated and spatially inverted laser beam across the flow of the chemical medium such that the first edge of the redirected laser beam is now downstream of the second edge of the redirected laser beam.

13. A method according to claim 12 further comprising forming an output laser beam from at least some of the redirected laser beam following a single pass of the collimated laser beam across said laser cavity.

14. A method according to claim 13 wherein directing the expanding laser beam across the flow of the chemical medium comprises reflecting at least some of the redirected laser beam across the laser cavity.

15. A method according to claim 12 further comprising more greatly amplifying portions of the expanding laser beam proximate the first edge than portions of the expanding laser beam proximate the second edge while the expanding laser beam propagates across the flow of the chemical medium.

16. A method according to claim 15 further comprising more greatly amplifying portions of the redirected laser beam proximate the second edge than portions of the redirected laser beam proximate the first edge while the redirected laser beam propagates across the flow of the chemical medium.

* * * * *